US009814914B2

United States Patent
Ziaylek et al.

(10) Patent No.: US 9,814,914 B2
(45) Date of Patent: Nov. 14, 2017

(54) MOUNTING BRACKET WITH INERTIA DAMPENING MECHANISM FOR HOLDING A CYLINDRICAL TANK

(71) Applicant: Michael P. Ziaylek, Yardley, PA (US)

(72) Inventors: Michael P. Ziaylek, Yardley, PA (US); W. Brian McGinty, Huntington Valley, PA (US)

(73) Assignee: Michael P. Ziaylek, Yardley, PA (US)

( * ) Notice: Subject to any disclaimer, the term of this patent is extended or adjusted under 35 U.S.C. 154(b) by 0 days.

(21) Appl. No.: 14/921,810

(22) Filed: Oct. 23, 2015

(65) Prior Publication Data

US 2016/0114198 A1    Apr. 28, 2016

Related U.S. Application Data

(60) Provisional application No. 62/122,542, filed on Oct. 23, 2014, provisional application No. 62/123,217, filed on Nov. 10, 2014.

(51) Int. Cl.
| | |
|---|---|
| *A47K 1/08* | (2006.01) |
| *A62B 25/00* | (2006.01) |
| *F16F 7/10* | (2006.01) |

(52) U.S. Cl.
CPC ............... *A62B 25/00* (2013.01); *F16F 7/10* (2013.01)

(58) Field of Classification Search
CPC ... A62B 25/00; F16F 7/10; A45F 3/16; A45C 2200/20; F17C 2205/0173; F17C 2205/0188; F17C 13/084

USPC ...... 248/311.2, 313, 231.85, 312; 224/148.4, 224/148.7, 251
See application file for complete search history.

(56) References Cited

U.S. PATENT DOCUMENTS

| | | | |
|---|---|---|---|
| 1,328,271 | A | 1/1920 | Dutemple |
| 2,431,698 | A | 12/1947 | Lombard |
| 2,615,238 | A | 10/1952 | Highwood |
| 3,194,529 | A | 7/1965 | Brock |
| 3,224,644 | A | 12/1965 | Davis |
| 3,490,727 | A | 1/1970 | Miller |
| 3,547,391 | A | 12/1970 | Johnson |
| 3,565,384 | A | 2/1971 | Lockwood |
| 3,603,550 | A | 9/1971 | Byrd |
| D222,527 | S | 11/1971 | Ziaylek, Jr. |
| 3,667,714 | A | 6/1972 | Ziaylek, Jr. |
| 3,780,972 | A | 12/1973 | Brodersen |
| 3,791,403 | A | 2/1974 | Folkerth |
| 3,823,907 | A | 7/1974 | Ziaylek, Jr. |
| D237,357 | S | 10/1975 | Ziaylek |
| 3,971,591 | A | 7/1976 | Ziaylek |

(Continued)

*Primary Examiner* — Kimberly Wood
(74) *Attorney, Agent, or Firm* — Fox Rothschild LLP

(57) ABSTRACT

A mounting assembly for mounting a tank including a backing plate, a foot plate secured to a bottom portion of the backing plate and a clamping assembly secured to a top portion of the backing plate spaced from the foot plate such that a tank receiving zone is defined between the foot plate and the clamping assembly. The clamping assembly includes a bracket secured to the backing plate and a clamping member pivotally secured to the bracket and movable between a clamping position and a releasing position. An inertial assembly is configured to engage a portion of the clamping member and configured such that upon a high pivoting force, the inertial assembly prevents pivoting o the clamping member while allowing pivoting under a normal pivoting force.

9 Claims, 6 Drawing Sheets

(56) References Cited

U.S. PATENT DOCUMENTS

| | | |
|---|---|---|
| D245,929 S | 9/1977 | Montambo |
| 4,213,592 A | 7/1980 | Lingenfelser |
| 4,304,383 A | 12/1981 | Huston |
| D264,935 S | 6/1982 | Ziaylek, Jr. |
| D265,287 S | 7/1982 | Ziaylek, Jr. |
| D267,227 S | 12/1982 | Ziaylek, Jr. |
| 4,379,541 A | 4/1983 | Harkness |
| 4,434,961 A | 3/1984 | Hoye |
| 4,505,448 A | 3/1985 | Massie |
| 4,586,687 A | 5/1986 | Ziaylek, Jr. |
| D298,704 S | 11/1988 | Ziaylek, Jr. |
| 4,848,714 A | 7/1989 | Ziaylek, Jr. et al. |
| D303,738 S | 10/1989 | Ziaylek, Jr. |
| D314,325 S | 2/1991 | Ziaylek, Jr. et al. |
| D319,778 S | 9/1991 | Ziaylek, Jr. |
| 5,213,392 A | 5/1993 | Bostrom et al. |
| 5,314,233 A | 5/1994 | Bostrom et al. |
| D347,735 S | 6/1994 | Ziaylek, Jr. et al. |
| 5,342,009 A | 8/1994 | Lehner |
| 5,681,080 A | 10/1997 | Pond et al. |
| D390,367 S | 2/1998 | Demski et al. |
| D394,381 S | 5/1998 | Ziaylek, Jr. et al. |
| 5,803,544 A | 9/1998 | Block et al. |
| 5,934,749 A | 8/1999 | Pond et al. |
| 6,702,242 B1 | 3/2004 | Ziaylek, Jr. et al. |
| 6,769,659 B1 | 8/2004 | Martello |
| 6,830,226 B2 | 12/2004 | Field et al. |
| D562,116 S | 2/2008 | Ziaylek et al. |
| 7,448,586 B2 | 11/2008 | Ziaylek et al. |
| 7,758,004 B2 | 7/2010 | Brookman et al. |
| D620,783 S | 8/2010 | Ziaylek |
| 7,878,472 B2 * | 2/2011 | Lackore .................. B60R 11/00 211/75 |
| 7,922,246 B2 * | 4/2011 | Gale ...................... B60R 11/00 248/313 |
| 7,975,978 B2 | 7/2011 | Ziaylek |
| 8,220,764 B2 | 7/2012 | Ziaylek |
| D729,142 S | 5/2015 | Ziaylek et al. |
| 2009/0045657 A1 | 2/2009 | Bostrom et al. |
| 2009/0250582 A1 | 10/2009 | Ziaylek |

* cited by examiner

MOUNTING BRACKET WITH INERTIA DAMPENING MECHANISM FOR HOLDING A CYLINDRICAL TANK

This application claims the benefit of U.S. Provisional Patent Application No. 62/122,542, filed on Oct. 23, 2014, and U.S. Provisional Application No. 62/123,217, filed on Nov. 10, 2014, the contents of each of which are incorporated herein by reference.

FIELD OF THE INVENTION

The present invention deals with brackets and other similarly constructed mounting devices utilized for detachably securing of cylindrical tanks such as emergency breathing apparatus tanks in position within emergency vehicles. It is important that such tank be fully and securely held therein but also be available for quick and easier removal by emergency personnel once the vehicle reaches the location of the fire or other emergency. Many devices have been designed for detachably securing such tanks including various clamping mechanisms and most are utilized for storing the cylindrical tank in an inverted position since this is the tank position when attached to the torso of an emergency worker. The present invention provides a unique means for minimizing extremely rapid or instantaneous movement of the bracket from the clamping position to the releasing position which would be experienced in an accident by the emergency vehicle or an unusually rapid movement. Such cylindrical tanks are quite heavy and the uncontrolled release of such a heavy piece of equipment during an accident or other rapidly decelerating incident could easily injure emergency personnel in the immediate area.

BACKGROUND OF THE INVENTION

Many prior art devices have been utilized for the purpose of retaining cylindrical tanks in an inverted position which are designed to hold them securely while allowing rapid release when needed. Examples of such construction are shown in U.S. Pat. No. 2,431,698 patented Dec. 2, 1947 to H. Lombard on a "Removable Mounting Installation" and U.S. Pat. No. 2,615,238 patented Oct. 28, 1952 to W. Highwood on a "Tank Clamp Support Holder"; and U.S. Pat. No. 3,194,529 patented Jul. 13, 1965 to G. R. Brock on a "Bracket For Holding Fire Extinguishers"; and U.S. Pat. No. 3,224,644 patented Dec. 21, 11965 to W. J. Davis on a "Dispenser"; and U.S. Pat. No. 3,490,727 patented Jan. 20, 1970 to H. Q. Miller on a "Holding Apparatus For Loads Adapted To Be Strapped To The Back Of Humans"; and U.S. Pat. No. 3,547,391 patented Dec. 15, 1970 to D. E. Johnson on a "Quick Release Support For Rescue Breathing Apparatus"; and U.S. Pat. No. 3,565,384 patented Feb. 23, 1971 to L. A. Lockwood and assigned to Bernzomatic Corporation on a "Bracket For Holding And Clamping Gas Cylinder Type Fire Extinguisher Tanks"; and U.S. Pat. No. 3,603,550 patented Sep. 7, 1973 to C. D. Byrd and assigned to Lacy J. Miller Machine Company, Inc. on a "Quick Release Support"; and U.S. Pat. No. 3,667,714 patented Jun. 6, 1972 to T. Ziaylek, Jr. on a "Tank Support"; and U.S. Pat. No. 3,780,972 patented Dec. 25, 1973 to J. C. Brodersen on a "Mounting Apparatus For Gas Containers"; and U.S. Pat. No. 3,823,907 patented Jul. 16, 1974 to T. Ziaylek, Jr. on a "Positive Locking Device"; and U.S. Pat. No. 3,971,591 patented Jul. 27, 1976 to J. Ziaylek and assigned to Ziamatic Corporation on a "Quic-Seat"; and U.S. Pat. No. 4,213,592 patented Jul. 22, 1980 to D. J. Lingenfelser and assigned to Caterpillar Tractor Co. on a "Bracket Assembly For Mounting Fire Extinguishers Thereon"; and U.S. Pat. No. 4,304,383 patented Dec. 8, 1981 to P. O. Huston on a "Bracket For Holding A Tank"; and U.S. Pat. No. 4,379,541 patented Apr. 12, 1983 to D. M. Harkness on a "Holder For A Container"; and U.S. Pat. No. 4,505,448 patented Mar. 19, 1985 to C. P. Massie on a "Bracket For Fire Extinguishers"; and U.S. Pat. No. 4,586,687 patented May 6, 1986 to T. Ziaylek, Jr. on an "Air Tank Support Of The Quick Release Type"; and U.S. Pat. No. 4,848,714 patented Jul. 18, 1989 to T. Ziaylek, Jr. et al on a "Mounting Plate With Rollers"; and U.S. Pat. No. 5,213,392 patented May 25, 1993 to J. M. Bostrom et al on a "Seat Construction"; and U.S. Pat. No. 5,314,233 patented May 24, 1994 to J. M. Bostrom et al on a "Seat Construction Having A Mechanism For Storing A Tank"; and U.S. Pat. No. 5,681,080 patented Oct. 28, 1997 to G. M. Pond et al and assigned to Seats, Inc. on a "Vehicle Seat For Person Wearing Self-Contained Breathing Apparatus"; and U.S. Pat. No. 5,803,544 patented Sep. 8, 1998 to W. R. Block et al and assigned to H. O. Bostrom Company, Inc. on a "Seat Construction With Removable Side Cushions"; and U.S. Pat. No. 5,934,749 to G. M. Pond and assigned to Seats, Inc. on a "Vehicle Seat With Removable Bolsters And Pivoting Headrest Members"; and U.S. Pat. No. 6,702,242 patented Mar. 9, 2004 to T. Ziaylek, Jr. et al on a "Releasable Tank Holding Assembly Securable To A Hollow Seat Back To Facilitate Detachable Securement Of A Tank Thereinto"; and U.S. Pat. No. 6,769,659 patented Aug. 3, 2004 to G. A. Martello on a "Bottle Bracket"; and U.S. Pat. No. 6,830,226 patented Dec. 14, 2004 to B. J. Field et al and assigned to Pacific Safety Products Inc. on a "Quick Release Supporting Apparatus For A Canister"; and U.S. Pat. No. 7,975,978 patented Jul. 12, 2011 to M. P. Ziaylek on a "Positively Engaging Mounting Apparatus For Securely And Detachably Retaining Of A Cylindrical Tank"; and U.S. Design Pat. No. D222,527 patented Nov. 2, 1971 to T. Ziaylek, Jr. on a "Bracket For Use With Lifesaving Equipment"; and U.S. Design Pat. No. D237,357 patented Oct. 28, 1975 to T. Ziaylek, Jr. and assigned to Ziamatic Corporation on a "Tank Support Bracket For Lifesaving Equipment"; U.S. Design Pat. No. D245,929 patented Sep. 27, 1977 to R. J. Montambo and assigned to The Ansul Company on a "Fire Extinguishing Bracket"; and U.S. Design Pat. No. D264,935 patented Jun. 15, 1982 to T. Ziaylek, Jr. and assigned to Ziamatic Corporation on a "Combined Support And Display Bracket For A Self-Contained Breathing Apparatus"; and U.S. Design Pat. No. D265,287 patented Jul. 6, 1982 to T. Ziaylek, Jr. on a "Support Bracket For Biomarine Breathing Apparatus"; and U.S. Design Pat. No. D267,227 patented Dec. 14, 1982 to T. Ziaylek, Jr. and assigned to Ziamatic Corporation on a "Support Bracket For A Gas Cylinder"; and U.S. Design Pat. No. D298,704 patented Nov. 29, 1988 to T. Ziaylek, Jr. on a "Seat For Use Primarily In Emergency Vehicles"; and U.S. Design Pat. No. 1,303,738 patented Oct. 3, 1989 to T. Ziaylek, Jr. on a "Rotatable Cylinder Holder"; and U.S. Design Pat. No. D314,325 patented Feb. 5, 1991 to T. Ziaylek, Jr. et al on a "Clamping Set Of Bracket Arms For Supporting Tubular Objects"; and U.S. Design Pat. No. D319,778 patented T. Ziaylek, Jr. on a "Vertical Support Brace Bracket Panel For Holding Tubular Objects"; and U.S. Design Pat. No. D347,735 patented Jun. 14, 1994 to T. Ziaylek, jr. et al on a "Quick Release Support Tank Bracket"; and U.S. Design Pat. No. 1,390,367 patented Feb. 10, 1998 to R. F. Demski et al and assigned to Seats, Inc. and Pierce Manufacturing Inc. on a "Vehicle Seat"; and U.S. Design Pat. No. D394,381 patented May 19, 1998 to T. Ziaylek, Jr. et al on a "Tank Bracket".

SUMMARY OF THE INVENTION

In at least one embodiment, the present invention provides a tank mounting assembly which facilitates quick release of a tank therefrom and allows the tank to be positioned in the tank holding zone by merely placing the head of the tank in contact with the base of the bracket and rotating the upwardly facing bottom portion of the tank into the holding zone.

In at least one embodiment, the present invention provides a tank mounting assembly for holding a cylindrical tank inverted which facilitates quick release and includes one or more assemblies for limiting rapid movement of the clamping member from the clamping position to the releasing position.

In at least one embodiment, the present invention provides a tank mounting assembly for holding a cylindrical tank in an inverted position which facilitates quick release thereof and yet firmly holds the tank in place to prevent injury to the wearer which could result from a motor vehicle accident of an emergency vehicle by limiting movement of the clamping member in the direction from the locking position to the unlocking position by the inclusion of an inertia dampening mechanism.

In at least one embodiment, the present invention provides a tank mounting assembly for positively engaging an inverted tank which facilitates providing quick access thereto and is particularly usable in securing an air tank to the rear portion of the seat in which persons, such as emergency workers, can be seated.

In at least one embodiment, the present invention provides a tank mounting assembly for positively engaging an inverted tank and facilitating quick release thereof which allows rapid manual release of the tank from the seat and the mounting assembly while preventing instantaneous release of the tank by the mounting assembly.

In at least one embodiment, the present invention provides a tank mounting assembly which engages the inverted tank securely and which also facilitates quick release thereof only in a safe and secure slower manner.

In at least one embodiment, the present invention provides a tank mounting assembly for holding an inverted tank which can easily be manually released in a normal speed while instantaneous release is prevented when exposed to high lateral forces commonly experienced during a vehicle collision which protection is provided by an inertia dampening mechanism.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION OF THE INVENTION

Figure 1:
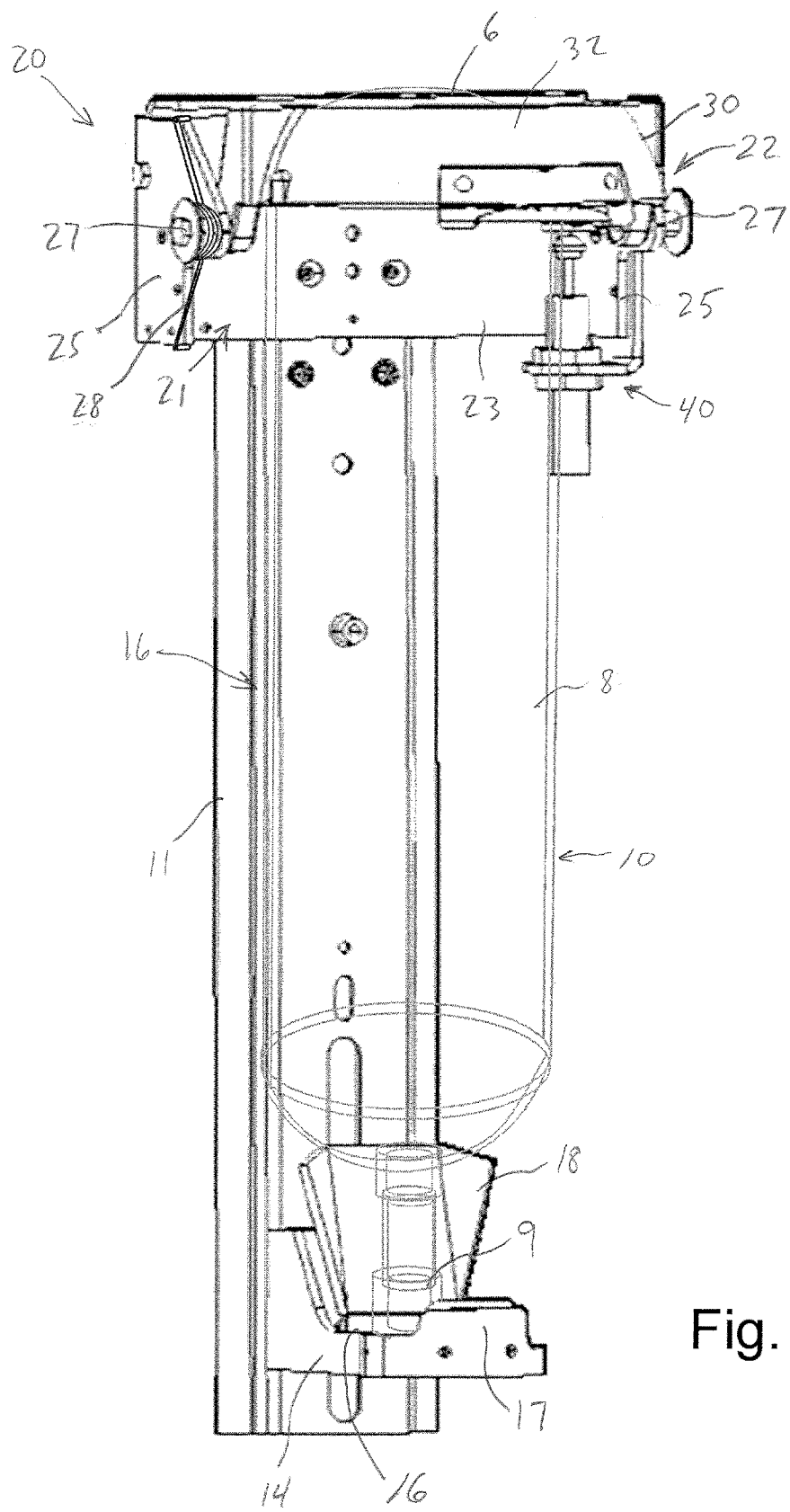
FIG. 1 is a perspective view of an exemplary mounting assembly in accordance with an embodiment of the present invention with a cylindrical tank illustrated therein in phantom.

In the drawings, like numerals indicate like elements throughout. Certain terminology is used herein for convenience only and is not to be taken as a limitation on the present invention. The following describes preferred embodiments of the present invention. However, it should be understood, based on this disclosure, that the invention is not limited by the preferred embodiments described herein.

Figure 2:
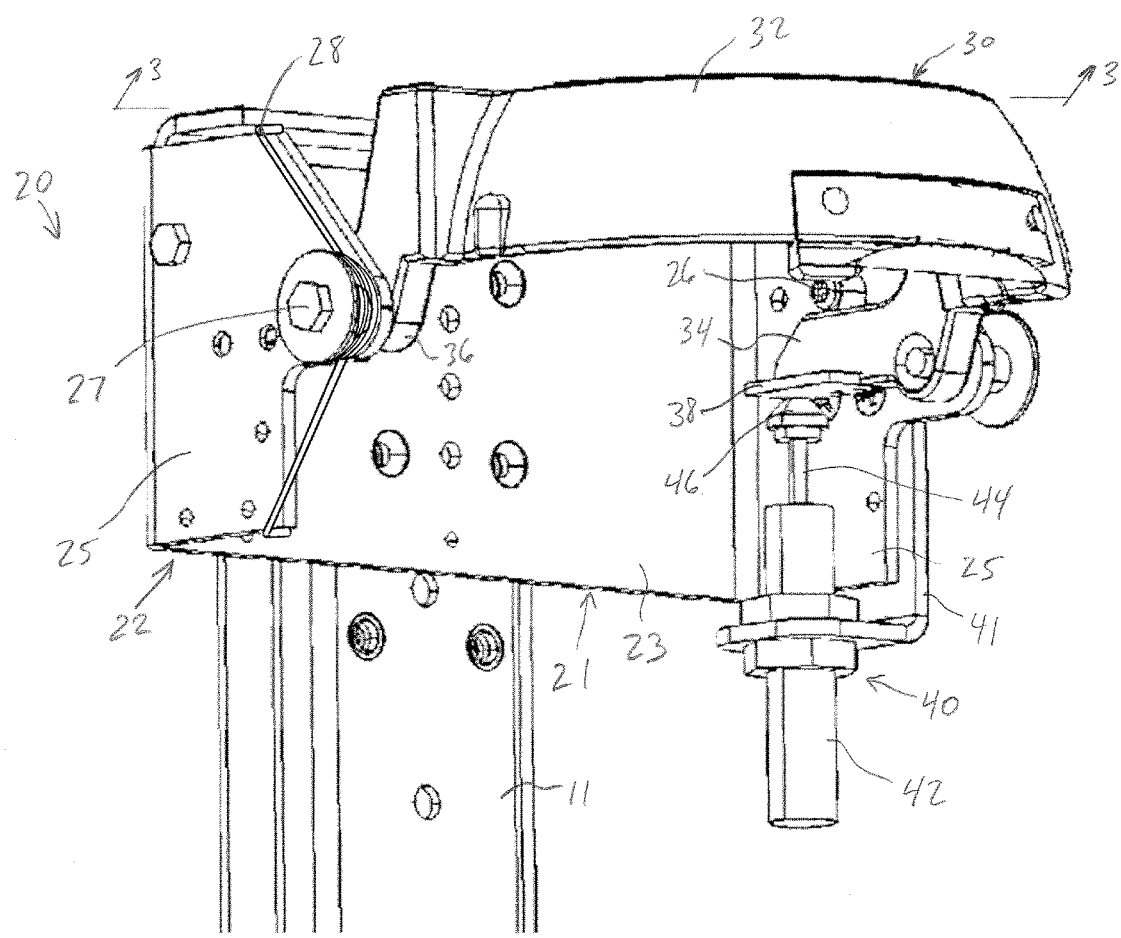
FIG. 2 is an expanded perspective view of the mounting assembly of FIG. 1 with the mounting bracket in a clamping position.
Figure 3:
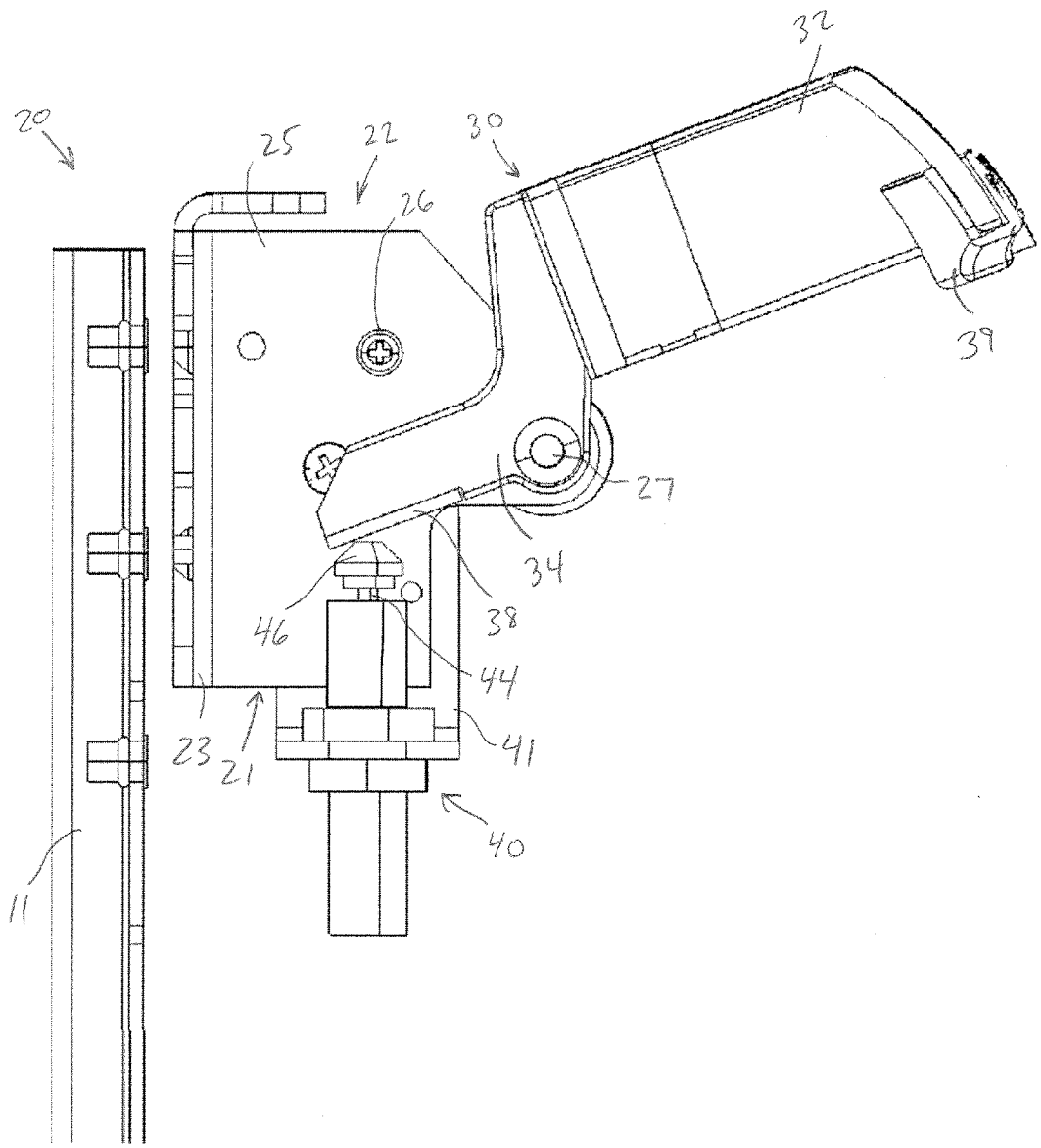
FIG. 3 is a cross-sectional view along the line 3-3 in FIG. 2 with the mounting bracket in a releasing position.

Referring to FIGS. 1-3, an exemplary releasable mounting assembly 20 which securely retains a cylindrical tank 10 in an inverted position and includes an inertia dampening mechanism 40 for preventing release of a cylindrical tank 10 held therewithin responsive to exposure thereof to sudden laterally directed forces such as experienced during a vehicular accident. This apparatus is particularly designed to allow mounting of a cylindrical tank 10 with respect to the seatback assembly of otherwise conventional seating in vehicles such as fire trucks or other emergency vehicles which require ready availability of cylindrical tanks 10 such as for supplying oxygen to firemen or other emergency workers.

The mounting assembly 20 includes a backing plate 11 which is generally a vertically extending member and which can be easily attached to a seatback or any other environmental structure within an emergency or other vehicle for the purpose of facilitating mounting of the cylindrical tank 10 therewithin. The backing plate 11 often define a plurality of apertures extending therethrough to facilitate securement with threaded fasteners such as screws or bolts with respect to environmental structure.

A foot member or foot plate 14 is secured to the bottom portion of the backing plate 11 and is adapted to support the tank head 9 of cylindrical tank 10 in an inverted position. Foot plate 14 is, preferably, defined in the shape of a foot cup 16 facing upwardly to facilitate receiving of the cylindrical tank head 9 therewithin. Guiding of movement of the cylindrical tank head 9 into the foot cup 16 is achieved by the positioning of a foot guiding plate 18 at an intermediate location within the foot cup 16 and spatially disposed from the backing plate 11. The foot cup 16 preferably includes a foot front stop 17 which is spaced from the foot guiding plate 18 by a distance approximately equal to the size of the cylindrical tank head 9. In this manner, as the tank 10 is moved into the tank receiving zone 16, the cylindrical tank head 9 comes into abutment with the foot guiding plate 18. As the tank 10 moves into the tank receiving zone 16, the foot guiding plate 18 guides the tank head 9 into the location between the foot guiding plate 18 and the front foot stop 17 of foot cup 16 due to the inclined orientation of the outer facing surface of the foot guiding plate 18. This apparatus significantly facilitates the repeated placement of a cylindrical tank head 9 in abutment with the present mounting assembly 20 when securing a cylindrical tank 10 oriented in an inverted position within the tank receiving zone 16.

A clamping assembly 22 extends from the backing plate 11 at a position significantly higher or above the location of the foot plate 14. In this manner, a tank receiving zone 16 extends longitudinally vertically along the vertically extending backing plate 11 between the clamping assembly 22 and the foot plate 14 therebelow. This tank receiving zone 16 as so defined facilitates the mounting of the cylindrical tank 10 in an inverted orientation with the cylinder tank head 9 positioned in abutment with the foot plate 14 and with the body portion 8 of the tank 10 extending upwardly along the backing plate 11, and generally parallel with respect thereto, to a location wherein positioning of a clamping member 30 of the clamping assembly 22 in a clamping position facilitates maintaining of the tank 10 in the inverted orientation. As described in more detail hereinafter, the clamping member 30 is movable between the clamping position illustrated in FIGS. 1 and 2 and a releasing position as illustrated in FIG. 3 which allows removal of tank 10 from the mounting assembly 20 by removal thereof from the tank receiving zone 16.

The clamping assembly 22, preferably, is mounted with respect to the backing plate 11 in an orientation extending general perpendicularly outwardly therefrom. The clamping assembly 22 includes a bracket 21 having a back plate 23 with opposed side plates 25 extending therefrom. Preferably, the back plate 23 extends generally parallel with respect to the plane of the backing plate 11 at a location thereabove and the side plates 25 extend outwardly from the back plate 23. With this configuration, the bracket 21 has a generally C-shaped configuration which receives the body portion 8 of cylindrical tank 10 therein.

The clamping member 30 also has a generally C-shaped configuration with an arcuate central portion 32 extending between opposed arms 34 and 36. Each arm 34, 36 is pivotally attached to a respective side plate 25 via a pivot pin 27. The clamping member 30 is pivotally movable between the clamping position and the releasing position. In the clamping position, the cylindrical tank 10, including the tank head 9 and the tank body 8, are fixedly secured within the tank receiving zone 16. Movement of the clamping member 30 toward the releasing position releases the body 8 and head 9 of the cylindrical tank 10 from the tank receiving zone 16 and allows it to be released from the bracket assembly and utilized normally at the location of an emergency situation where emergency personnel would often need a portable supply of oxygen.

A return biasing means 28, illustrated as a flexibly resilient wire coil spring, is wound about one of the pivot pins 27 and is secured at both ends relative to the bracket 21. The wire coil spring engages the pivot pin 27 and biases the pivot pin 27, and thereby the clamping member 30, toward the clamping position with a moderate continuously exerted force. While a wire coil spring engaged with the pivot pin 27 is illustrated, other biasing assemblies may be utilized, for example, a coil spring extending between the bracket 31 and the clamping member 30. A stop 26 is positioned extending through one of the side plates 35 and engages the respective arm 34 and prevents over rotation of the clamping member 30.

Movement of the clamping member 30 from the clamping position to the releasing position to facilitate release of the tank 10 from the mounting assembly 20 is most commonly achieved by manually overpowering the force exerted by the return biasing means 28 by lifting the front portion of the clamping member 30 and causing it to pivot toward the releasing position. Preferably, the clamping member 30 is also configured to allow for automatic movement of clamping member 30 to the releasing position when the wearer of the tank 10 gets up from the seat they are in. To facilitate such, the clamping member 30 has an internal slope 39 (see FIG. 3) which engages a rounded portion 6 of the tank body 8, whereby pulling of the tank 10 away from the backing plate 11 pushes on the sloped surface 39 and moves the clamping member 30 to the releasing position.

While it is convenient for the mounting assembly 20 to easily release the tank 10 when the wearer intentionally exits the seat, the mounting assembly 20 is configured such that the tank 10 will not be released do to an unintended lateral force, for example, an inertia force caused by a sudden, sharp change of speed of the vehicle. To achieve such, the mounting assembly 20 of the present embodiment includes an inertia dampening mechanism 40 which engages a portion of the clamping mechanism 30 and prevents pivoting thereof in response to a sudden high force.

The exemplary inertia dampening mechanism 40 includes a hydraulic control cylinder 42 which is attached to the bracket 21 via a dampener mounting bracket 41. In the illustrated embodiment, the dampener mounting bracket 41 has an L-shape and is attached to one of the side plates 25. The dampener mounting bracket 41 may have other configurations and may be otherwise attached, for example, to the back plate 23. Mounting is such that the control cylinder 42 is aligned with a contact plate 38 on the arm 34 of the clamping member 30. A piston rod 44 extends from the control cylinder 42 and terminates in a stop member 46 configured to contact the contact plate 38. The stop member 46 may be of any material such as rubber, plastic or metal. Alternatively, the stop member may be eliminated and the piston rod 42 may directly contact the contact plate 38.

The opposite end of the piston rod 44 includes a piston (not shown) positioned within the control cylinder 42. The piston is movable through a hydraulic media which may be fluid or gaseous. The piston and hydraulic media are selected such that flow within the control cylinder 42 restricts rapid movement of the piston rod 42 downwardly within the control cylinder 42. For example, the piston may have a small through hole which allows the hydraulic media to pass through, however, not at a rapid pace. As such, it is extremely difficult to rapidly collapse the piston rod 44 into the control cylinder 42. On the other hand, it is very easy to slowly move the piston rod 44 into the control cylinder 42 for slowly collapsing the piston rod 44 into the control cylinder 42.

As such, by mounting of the inertia dampening mechanism 40 in a position aligned with the contact plate 38, the inertia dampening mechanism 40 controls pivotal movement of the clamping member 30. More specifically, when the clamping member 30 is in the clamping position, the contact plate 38 is in generally direct abutment with the stop member 46 of the extended piston rod 44 as shown in FIG. 2. In order to pivot to the releasing position illustrated in FIG. 3, the contact plate 38 must contact the stop member 46 and compress the piston rod 44 into control cylinder 42.

With the illustrated configuration, compression of the piston rod 44 into the control cylinder 42 of the inertia dampening mechanism 40 is required every time the clamping member 30 is pivoted from the clamping position to the releasing position. Thus, releasing of the cylindrical tank 10 from the tank receiving zone 16 can only be achieved after compression of the piston rod 44 into the control cylinder 42 of dampening mechanism 40. Thus, the operating characteristics within the inertia dampening mechanism 40 are such that it is highly resistant to high speed or sudden or instantaneous movement of the clamping member 30 toward the releasing position such as may be experienced in a vehicular accident or any exposure thereof to high laterally directed forces (high pivoting force) wherein release of the tank 10 from the bracket assembly 20 could provide a danger to any emergency personnel within the vehicle. However, with this construction, the movement of the clamping member 30 slowly from the clamping position to the releasing position, such as by manual operation thereof or automatic operation with movement from the seat (normal pivoting force), is easily achievable. Thus, the use of this construction of the present invention provides a means for allowing normal manual release of a tank 10 from the bracket assembly 20 of the present invention responsive to normal manual manipulation and operation or pivoting of the top clamping member 30 whereas, on the other hand, rapid movement responsive to extremely high or instantaneous laterally direct forces are rendered virtually impossible. This construction provides an important safety advantage to prevent the somewhat heavy and cylindrical tank 10 from being released in response to a vehicular accident because the release of such a tank under those circumstances could easily injure surrounding emergency personnel seated within the passenger compartment of the emergency vehicle.

Figure 4:
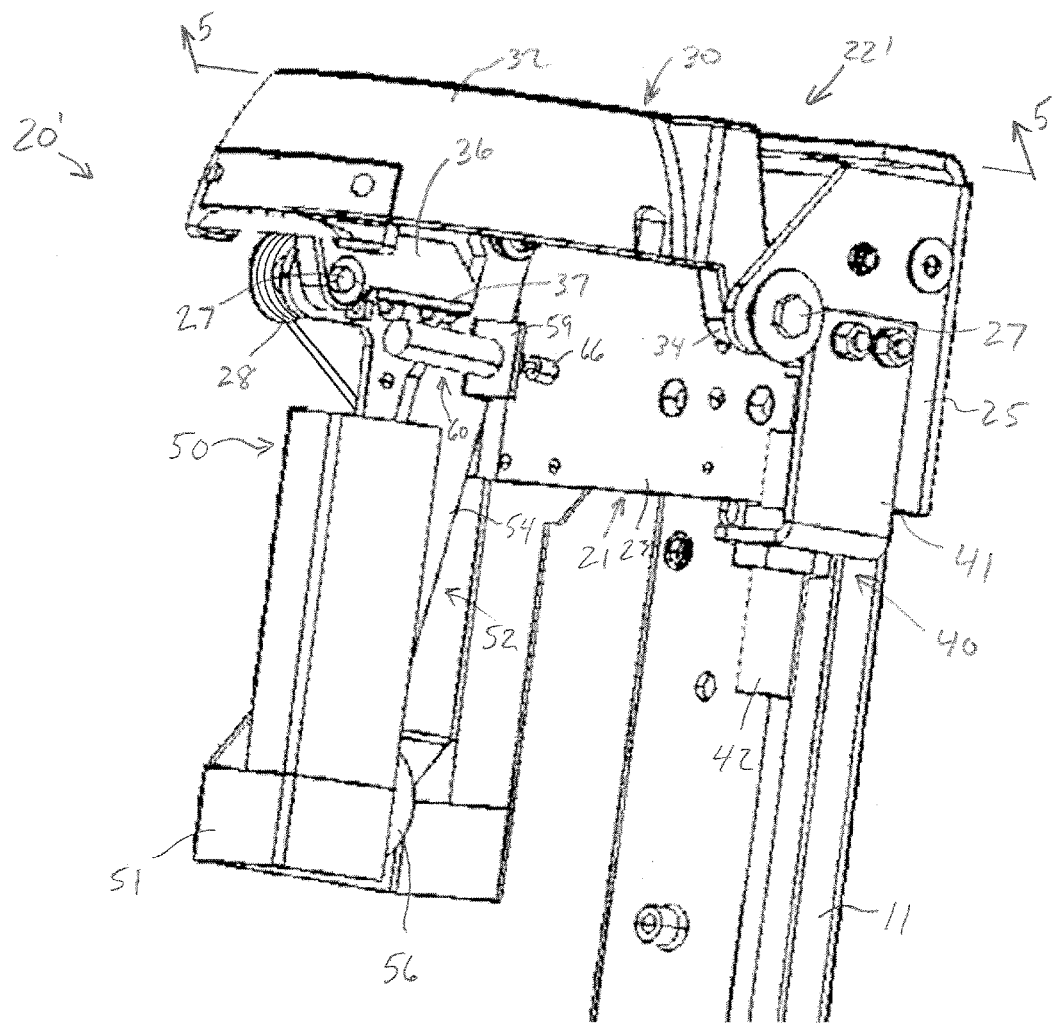
FIG. 4 is perspective view of another exemplary mounting assembly in accordance with an embodiment of the invention.
Figure 5:
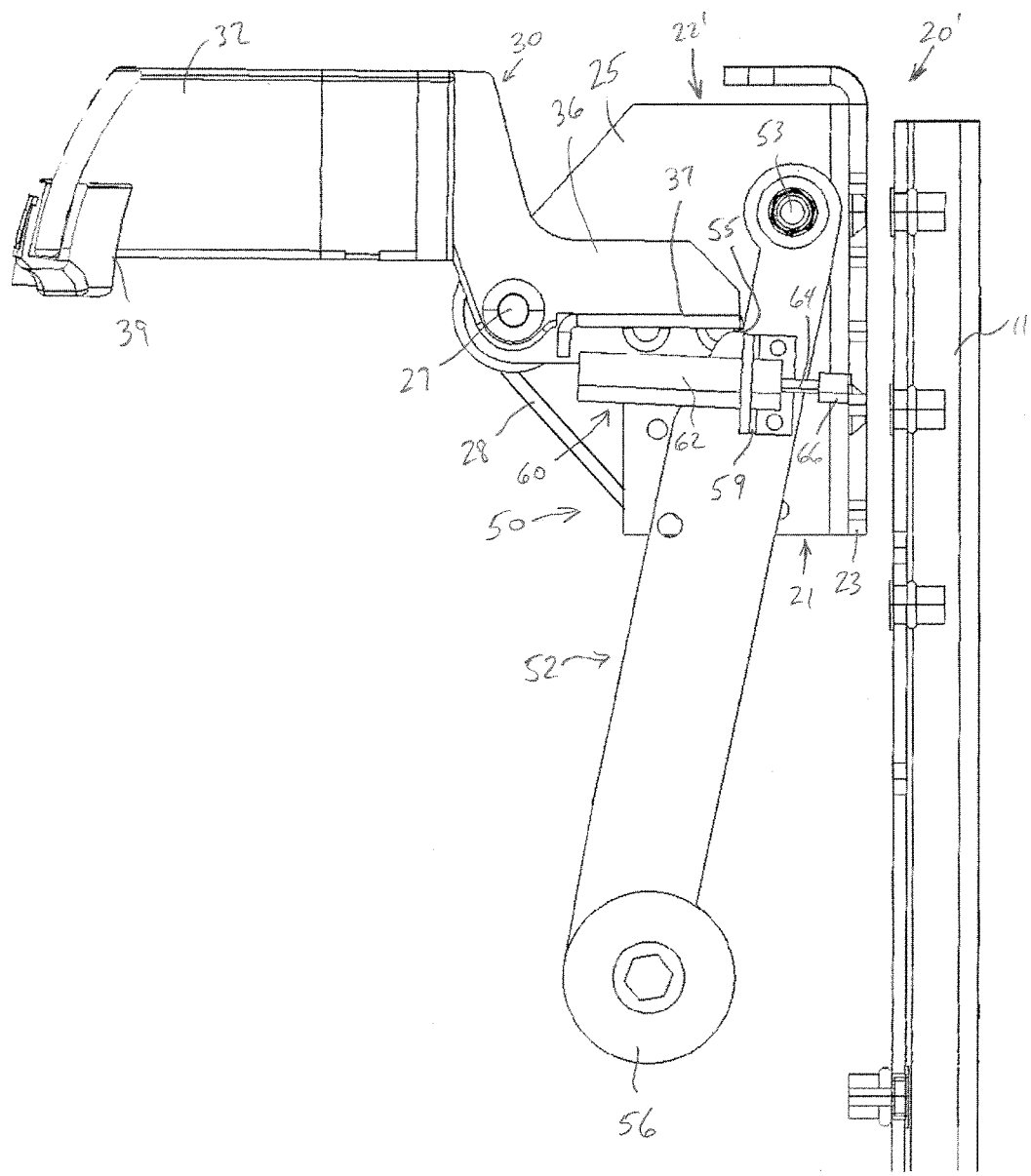
FIG. 5 is a cross-sectional view along the line 5-5 in FIG. 4, with the protective housing removed for clarity, showing the mounting bracket in a clamping position.
Figure 6:
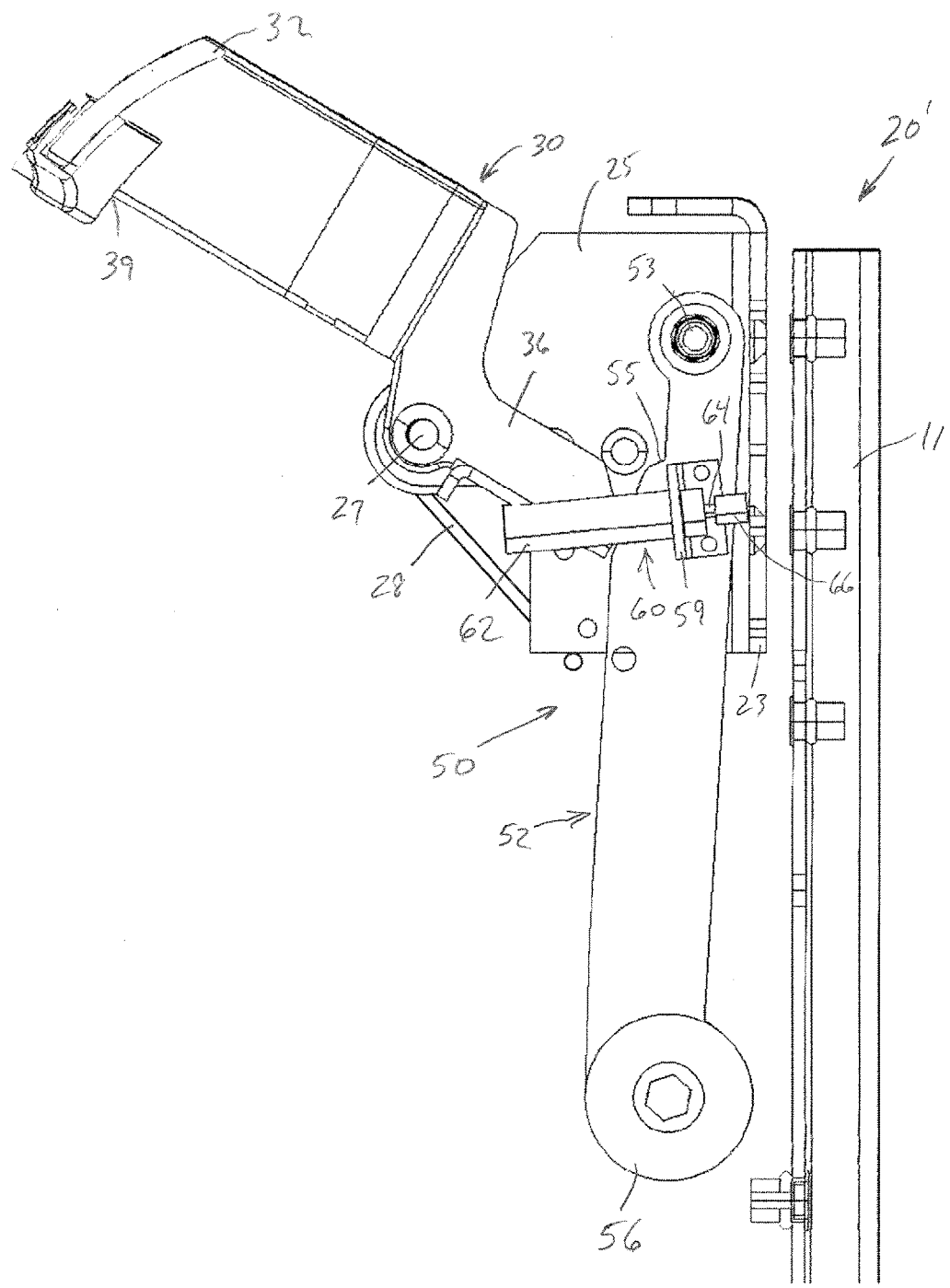
FIG. 6 is a cross-sectional view similar to FIG. 5 showing the mounting bracket in a releasing position.

Referring to FIGS. 4-6, a mounting assembly 20' in accordance with another embodiment of the invention will be described. The mounting assembly 20' is similar to the previous embodiment and includes a clamping assembly 22' with a bracket 21 secured to the backing plate 11. The backing plate 11 includes a foot plate (not shown) similar to the previous embodiment. A clamping member 30 is pivotally secured relative to the bracket 21 and has an inertia dampening mechanism 40 which engages a contact plate 38 of one arm 34 of the clamping mechanism. The clamping assembly 22' of the present embodiment is distinct in that it further includes an inertia locking bar assembly 50 as will be described. The features common to both embodiments operate as previously described and will not be described again.

The inertial locking bar assembly 50 includes a locking bar 52 which is pivotally connected at one end to the other bracket side plate 35 at pivot point 53. The opposite end of the locking bar 52 includes a weight 56. The weight 56 may be secured to the locking bar 52 as illustrated or may be formed integrally therewith. The locking bar 52 defines a sloped shoulder 55 which contacts the contact plate 37 on arm 36 of the clamping mechanism 30 and maintains the clamping mechanism 30 in the clamping position. The clamping mechanism 30 is prevented from rotating to the releasing position so long as the locking bar 52 is in a locking position with the shoulder 55 aligned with the contact plate 37, as illustrated in FIGS. 4 and 5. A housing 51 may be connected to the side plate 35 and extend about the locking bar 52 to protect it from damage.

To maintain the locking bar 52 in the locking position, a dampening member 60 is secured to the locking bar 52 via a bracket 59. The dampening member 60 is similar to the inertia dampening mechanism 40 and includes a control cylinder 62, a piston rod 64 with a stop member 66 on one end and a piston (not shown) on the other end within the control cylinder. A hydraulic media within the control cylinder controls movement of the cylinder in a manner similar to that described above. The dampening member 60 is positioned such that in the locking position, the piston rod 44 is extended from the control cylinder 62 and the stop member 66 is engaged with the back plate 23 of the bracket 21.

To move the clamping member 30 to the releasing position as illustrated in FIG. 6, the locking bar 52 must pivot rearward such that the contact plate 37 clears the shoulder 55. Under normal pivoting force of the clamping member 30, e.g. from normal manual or automatic movement, the piston rod 64 is able to compress into the control cylinder 62 as the contact plate 37 slides along the slope of the shoulder 55 and moves the locking bar 52 rearward as necessary. In the event of a sudden high pivot force, the piston rod 64 is prevented from compressing into the compression cylinder 62 and the locking bar 52 is prevented from rearward movement. As such, the contact plate 37 remains engaged by the shoulder 55 and the clamping member 30 is prevented from rotating. Additionally, in the event of a sudden lateral movement, for example, due to excessive breaking or an accident, the weight 56 on the locking bar 52, which is spaced from the pivot point 53, experiences a high centripetal force toward the locking position, thereby additionally maintaining the locking bar 52 in the locking position.

The clamping assembly 22' of the present embodiment includes both the inertia dampening mechanism 40 and the inertia locking arm assembly 50 which provides redundancy. If such redundancy is not required in a particular application, it is understood that the clamping assembly 22' may include only the inertia locking arm assembly 50.

These and other advantages of the present invention be apparent to those skilled in the art from the foregoing specification. Accordingly, it be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A mounting assembly for mounting a tank, the mounting assembly comprising:
   a backing plate;
   a foot plate secured to a bottom portion of the backing plate; and
   a clamping assembly secured to a top portion of the backing plate spaced from the foot plate such that a tank receiving zone is defined between the foot plate and the clamping assembly, the clamping assembly comprising:
      a bracket secured to the backing plate and a clamping member pivotally secured to the bracket and movable between a clamping position and a releasing position; and
      an inertial assembly configured to engage a portion of the clamping member and configured such that upon a high pivoting force, the inertial assembly prevents pivoting of the clamping member while allowing pivoting under a normal pivoting force, wherein the inertial assembly includes an inertial dampening member including a piston rod extending from a control cylinder and configured to contact a contact plate on the clamping member, further wherein the piston rod is compressible into the control cylinder under normal pivoting force and prevented from compressing into the control cylinder under high pivoting force.

2. The mounting assembly of claim 1, wherein an end of the piston rod within the control cylinder includes a piston movable within a hydraulic media within the control cylinder.

3. The mounting assembly of claim 2 wherein the piston includes a through hole sized to allow passage of the hydraulic media under normal pivoting force and prevent passage of hydraulic media under high pivoting force.

4. The mounting assembly of claim 1, wherein a portion of the piston rod which contacts the contact plate includes a stop member.

5. A mounting assembly for mounting a tank, the mounting assembly comprising:
- a backing plate;
- a foot plate secured to a bottom portion of the backing plate; and
- a clamping assembly secured to a top portion of the backing plate spaced from the foot plate such that a tank receiving zone is defined between the foot plate and the clamping assembly, the clamping assembly comprising:
  - a bracket secured to the backing plate and a clamping member pivotally secured to the bracket and movable between a clamping position and a releasing position, and
  - an inertial assembly configured to engage a portion of the clamping member and configured such that upon a high pivoting force, the inertial assembly prevents pivoting of the clamping member while allowing pivoting under a normal pivoting force, wherein the inertial assembly includes a locking arm pivotally connected to the bracket at one end and supporting a weight at an opposite end, the locking arm defining a sloping shoulder configured to engage a contact plate of the clamping member wherein:
    - under normal pivoting force, the locking arm pivots away from the contact plate which is free to slide along the sloping shoulder, and
    - upon a high inertial force, the weight creates a circumferential force which pivots the locking arm toward engagement of the contact plate with the sloping shoulder and prevents pivoting of the clamping member.

6. The mounting assembly of claim 5 wherein the inertial assembly further comprises a dampening member secured to the locking bar, the dampening member including a piston rod extending from a control cylinder and configured to contact a portion of the bracket in a direction in which the locking bar must pivot to allow pivoting of the clamping member, the piston rod compressible into the control cylinder under normal pivoting force and prevented from compressing into the control cylinder under high pivoting force.

7. The mounting assembly of claim 6 wherein an end of the piston rod within the control cylinder includes a piston movable within a hydraulic media within the control cylinder and the piston includes a through hole sized to allow passage of the hydraulic media under normal pivoting force and prevent passage of hydraulic media under high pivoting force.

8. The mounting assembly of claim 5 wherein the inertial assembly further includes an inertial dampening member including a piston rod extending from a control cylinder and configured to contact a second contact plate on the clamping member, the piston rod compressible into the control cylinder under normal pivoting force and prevented from compressing into the control cylinder under high pivoting force.

9. The mounting assembly of claim 8 wherein an end of the piston rod within the control cylinder includes a piston movable within a hydraulic media within the control cylinder and the piston includes a through hole sized to allow passage of the hydraulic media under normal pivoting force and prevent passage of hydraulic media under high pivoting force.

* * * * *